(12) United States Patent
Zheng et al.

(10) Patent No.: US 12,107,505 B1
(45) Date of Patent: Oct. 1, 2024

(54) AUXILIARY POWER SOURCE CIRCUIT HAVING ULTRA-LOW STANDBY POWER CONSUMPTION

(71) Applicant: SHENZHEN UU GREEN POWER CO., LTD., Guangdong (CN)

(72) Inventors: Jianxiong Zheng, Guangdong (CN); Jianguo Bai, Guangdong (CN); Likuan Deng, Guangdong (CN)

(73) Assignee: SHENZHEN UU GREEN POWER CO., LTD., Shenzhen (CN)

( * ) Notice: Subject to any disclaimer, the term of this patent is extended or adjusted under 35 U.S.C. 154(b) by 0 days.

(21) Appl. No.: 18/689,093

(22) PCT Filed: Sep. 6, 2021

(86) PCT No.: PCT/CN2021/116680
§ 371 (c)(1),
(2) Date: Mar. 5, 2024

(87) PCT Pub. No.: WO2023/029040
PCT Pub. Date: Mar. 9, 2023

(51) Int. Cl.
*H02M 3/335* (2006.01)
*H02M 1/00* (2006.01)

(52) U.S. Cl.
CPC ..... *H02M 3/33515* (2013.01); *H02M 1/0032* (2021.05); *H02M 1/0048* (2021.05); *H02M 3/33523* (2013.01)

(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS 8,977,157 B2 * 3/2015 Odate .................... G03G 15/80
399/88
9,906,143 B1 * 2/2018 Yu ..................... H02M 3/33592
(Continued)

FOREIGN PATENT DOCUMENTS

CN 203104250 U 7/2013
CN 205319929 U 6/2016
(Continued)

OTHER PUBLICATIONS

International Search Report of PCT Patent Application No. PCT/CN2021/116680 issued on Jun. 9, 2022.
(Continued)

*Primary Examiner* — Jeffrey A Gblende

(57) ABSTRACT

Disclosed is an auxiliary power source circuit having an ultra-low standby power consumption, including a transformer, a PWM control chip, a battery power source, a first switch tube, a voltage division adjustment module, adjustment modules, and a control module. The control module selects an under-charge voltage of the battery on the basis of the minimum under-charge voltage of the battery and a power source voltage of the battery. Module parameters of the adjustment modules are adjusted, such that the power supply time of the control module can last until a power supply voltage of the PWM control chip is dropped. Therefore, an auxiliary power source circuit can be prevented from frequently performing self-start-up, thereby truly reducing the standby power consumption of a system and greatly reducing the current loss.

10 Claims, 3 Drawing Sheets

(58) Field of Classification Search
CPC ...... H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; H02M 1/0032; Y02B 70/1491
See application file for complete search history.

(56) References Cited

U.S. PATENT DOCUMENTS

| | | | |
|---|---|---|---|
| 2014/0369086 A1 | 12/2014 | Hayasaki | |
| 2018/0034378 A1* | 2/2018 | Lin | H02M 1/08 |
| 2023/0396170 A1* | 12/2023 | Yang | H02M 1/0022 |

FOREIGN PATENT DOCUMENTS

| | | |
|---|---|---|
| CN | 106953533 A | 7/2017 |
| WO | 2017113601 A1 | 7/2017 |

OTHER PUBLICATIONS

Written Opinion of the International Searching Authority of PCT Patent Application No. PCT/CN2021/116680 issued on Jun. 9, 2022.

* cited by examiner

AUXILIARY POWER SOURCE CIRCUIT HAVING ULTRA-LOW STANDBY POWER CONSUMPTION

TECHNICAL FIELD

The disclosure relates to the technical field of power source, and more particularly to an auxiliary power source circuit having ultra-low standby power consumption.

BACKGROUND

Normally, when the power source system is in standby mode, the main power circuit stops working, but the auxiliary power source circuit continues to operate until the battery voltage further drops to a point where the auxiliary power source cannot maintain normal operation. At this point, the system enters an "insufficient voltage standby" state. A typical example of the existing auxiliary power source circuit is shown in FIG. 1. The PWM control chip U1 in the auxiliary power source circuit generally has two working voltages: the minimum normal startup voltage VCC2 and the shutdown voltage VCC1 after normal operation. The chip manufacturer usually designs a voltage difference threshold to make VCC2>VCC1. The working process of PWM control chip U1 can be referred to FIG. 2.

The conventional auxiliary power source circuit has the following defects. As long as the battery voltage inputted from the auxiliary power source is greater than the minimum normal startup voltage VCC2 of the PWM control chip U1, the PWM control chip U1 starts working, even if the battery voltage at this time cannot make the auxiliary power source circuit work normally. In the entire auxiliary power source circuit, the PWM control chip U1 itself has been constantly starting frequently (commonly known as burping). Starting up once consumes the battery energy through the switching of the external MOS transistor and transformer. When the PWM control chip U1 operates, it consumes a current of 12 mA, but the excitation current of the battery through MOS transistor and transformer is usually several amperes. And this situation continues, causing the battery with already low energy to further deplete and reducing the lifespan of the battery. If the time of insufficient voltage is too long, it may cause the battery to be directly scrapped.

SUMMARY

Technical Problem

In this regard, the present disclosure provides an auxiliary power source circuit having ultra-low standby power consumption, aiming at the above technical problem, which circuit is capable of stopping frequently self-starting after shutdown, thereby truly reducing standby power consumption, and is capable of suppressing a circuit formation by a battery current passing through a transformer and an MOS transistor, thereby greatly reducing current loss.

Solution to the Problem

Technical Solutions

According to a first aspect, an auxiliary power source circuit having ultra-low standby power consumption is provided, including a transformer, a PWM control chip, a battery power source and a first switch tube which are arranged at a primary side of the transformer, and an output module which is arranged at a secondary side of the transformer;

wherein the auxiliary power source circuit having ultra-low standby power consumption further includes a voltage division and adjustment module, a first adjustment module, a second adjustment module, and a control module;

a first terminal of the voltage division and adjustment module is connected with the battery power source to receive an input voltage, a second terminal of the voltage division and adjustment module is grounded, and a third terminal of the voltage division and adjustment module is connected with a voltage terminal of the PWM control chip;

a first terminal of the first adjustment module is connected with the voltage terminal of the PWM control chip, a second terminal of the first adjustment module is connected with a primary coil of the transformer, and a third terminal of the first adjustment module is grounded;

a first terminal of the second adjustment module is connected with a secondary coil of the transformer, a second terminal of the second adjustment module is connected with a first terminal of the control module and a feedback control terminal of the PWM control chip, and a third terminal of the second adjustment module is grounded;

a second terminal of the control module is connected with the battery power source, a third terminal of the control module is grounded, and a fourth terminal of the control module is connected with the voltage terminal of the PWM control chip;

the control module is configured to calculate a minimum insufficient voltage of the battery power source according to a minimum startup voltage of the PWM control chip and a shutdown voltage of the PWM control chip, as well as a module parameter of the voltage division and adjustment module, and configured to select an insufficient voltage of the battery power source based on the minimum insufficient voltage of the battery power source and a battery power source voltage;

the control module is further configured to adjust a module parameter of the first adjustment module and a module parameter of the second adjustment module, so as maintain power supply time of the control module until a power supply voltage of the PWM control chip drops to power off the PWM control chip;

during an operation of the auxiliary power source circuit, the control module is further configured to acquire the input voltage and control a discharge speed of the power supply voltage when the input voltage is lower than the insufficient voltage of the battery power source; wherein the control module and the PWM control chip are powered off, after a discharge of the power supply voltage is completed;

the auxiliary power source circuit is configured to re-start working only when the battery power source is re-charged to supply the power supply voltage which is greater than the minimum startup voltage of the PWM control chip, after the input voltage drops to the insufficient voltage of the battery power source.

According to an embodiment of this disclosure, the voltage division and adjustment module includes a first resistor, a second resistor, and a first diode, wherein the first resistor and the second resistor are connected in series between the input voltage and the ground, a cathode of the first diode is connected with a voltage division point of the first resistor and the second resistor, and an anode of the first diode is grounded, wherein the voltage division point is configured to output the power supply voltage of the PWM control chip to the voltage terminal of the PWM control chip;

the control module is further configured to set resistance values of the first resistor and the second resistor, and calculate the minimum insufficient voltage of the battery power source based on the resistance values, the minimum startup voltage of the PWM control chip, and the shutdown voltage of the PWM control chip.

According to an embodiment of this disclosure, the first adjustment module includes a second diode and a first capacitor, wherein an anode of the second diode is connected with the primary coil of the transformer, a cathode of the second diode is connected with the voltage terminal of the PWM control chip and a first terminal of the first capacitor, a second terminal of the first capacitor is grounded.

According to an embodiment of this disclosure, the second adjustment module includes a third diode and a second capacitor, wherein an anode of the third diode is connected with the secondary coil of the transformer, a cathode of the third diode is connected with the first terminal of the control module and a first terminal of the second capacitor, and the second terminal of the second capacitor is grounded;

the control module is further configured to adjust capacitance values of the first capacitor and the second capacitor, so as to maintain the power supply time of the control module until the power supply voltage of the PWM control chip drops to power off the PWM control chip.

According to an embodiment of this disclosure, the control module includes an MCU, a third resistor, a fourth resistor, and a second switch tube; wherein a voltage terminal of the MCU is connected with the second terminal of the second adjustment module, an output terminal of the MCU is connected with a first terminal of the second switch tube through the third resistor, a second terminal of the second switch tube is connected with the voltage terminal of the PWM control chip through the fourth resistor, and a third terminal of the second switch tube is grounded; wherein a data acquisition terminal of the MCU is connected with the battery power source;

the MCU is configured to acquire the input voltage through the data acquisition terminal, and send a shutdown instruction through the output terminal when the input voltage is lower than the insufficient voltage of the battery power source, and adjust the fourth resistor, so as to adjust the discharge speed of the power supply voltage.

According to an embodiment of this disclosure, the control module further includes a fifth resistor and a sixth resistor, wherein the data acquisition terminal of the MCU is grounded through the sixth resistor and connected with the battery power source through the fifth resistor.

According to an embodiment of this disclosure, the MCU is further configured to adjust the insufficient voltage of the battery power source.

According to a second aspect, an auxiliary power source circuit having ultra-low standby power consumption is provided, including a transformer, and a PWM control chip, a battery power source, a first switch tube which are arranged at a primary side of the transformer;

wherein the auxiliary power source circuit having ultra-low standby power consumption further comprises a voltage division and adjustment module, an adjustment module, and a control module;

the voltage division and adjustment module includes a first resistor, a second resistor, and a first diode, wherein the first resistor and the second resistor are connected in series between an input voltage and ground, a cathode of the first diode is connected with a voltage division point of the first resistor and the second resistor, and an anode of the first diode is grounded, wherein the voltage division point is configured to output a power supply voltage of the PWM control chip to a voltage terminal of the PWM control chip;

the adjustment module includes a second diode, a first capacitor, a third diode and a second capacitor, an anode of the second diode is connected with a primary coil of the transformer, a cathode of the second diode is connected with a voltage terminal of the PWM control chip and a first terminal of the first capacitor, a second terminal of the first capacitor is grounded, an anode of the third diode is connected with a secondary coil of the transformer, a cathode of the third diode is connected with a first terminal of the second capacitor, and the second terminal of the second capacitor is grounded;

the control module includes an MCU, a third resistor, a fourth resistor, and a second switch tube; wherein a voltage terminal of the MCU is connected with the cathode of the third diode and a feedback control terminal of the PWM control chip, an output terminal of the MCU is connected with a first terminal of the second switch tube through the third resistor, a second terminal of the second switch tube is connected with the voltage terminal of the PWM control chip through the fourth resistor, and a third terminal of the second switch tube is grounded; wherein a data acquisition terminal of the MCU is connected with the battery power source;

the MCU is configured to set resistance values of the first resistor and the second resistor, and configured to calculate a minimum insufficient voltage of the battery power source based on the resistance values, a minimum startup voltage of the PWM control chip, and a shutdown voltage of the PWM control chip;

the MCU is further configured to select an insufficient voltage of the battery power source based on the minimum insufficient voltage of the battery power source and a battery power source voltage;

the MCU is further configured to adjust capacitance values of the first capacitor and the second capacitor, so as to maintain power supply time of the MCU until the power supply voltage of the PWM control chip drops to power off the PWM control chip;

the MCU is further configured to acquire the input voltage through the data acquisition terminal, send a shutdown instruction through the output terminal when the input voltage is lower than the insufficient voltage of the battery power source, and adjust the fourth resistor to adjust a discharge speed of the power supply voltage;

wherein the MCU and the PWM control chip are powered off, after a discharge of the power supply voltage is completed;

the auxiliary power source circuit is configured to re-start working only when the battery power source is re-charged to supply the power supply voltage which is greater than the minimum startup voltage of the PWM control chip, after the input voltage drops to the insufficient voltage of the battery power source.

According to an embodiment of this disclosure, the auxiliary power source circuit further includes a fifth resistor and a sixth resistor, wherein the data acquisition terminal of the MCU is grounded through the sixth resistor and connected with the battery power source through the fifth resistor.

According to an embodiment of this disclosure, the MCU is further configured to adjust the insufficient voltage of the battery power source.

Beneficial Effects of this Disclosure

Beneficial Effects

When implementing the auxiliary power source circuit having ultra-low standby power consumption, the auxiliary power source circuit no longer frequently performs self-starting after shutdown, thereby truly reducing standby power consumption, and suppresses a circuit formation by a battery current passing through a transformer and an MOS transistor, thereby greatly reducing current loss. In additional, the insufficient voltage of the battery power source in the auxiliary power source circuit is also flexibly adjustable.

BRIEF DESCRIPTION OF THE DRAWINGS

Description of the Drawings

This disclosure is further explained in conjunction with the accompanying drawings and embodiments.

Figure 1:
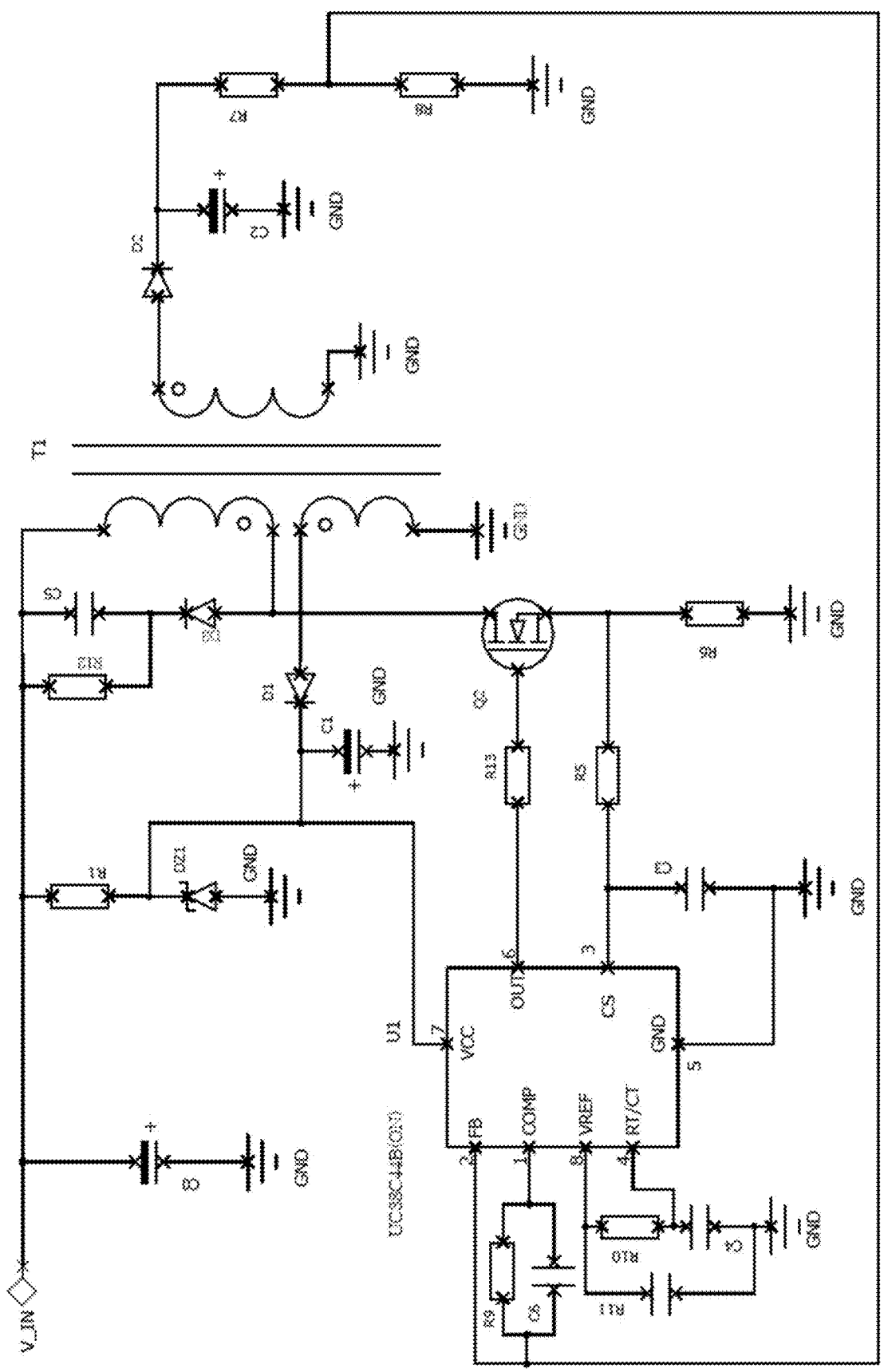

FIG. 1 is a schematic diagram of an auxiliary power source circuit of prior art.

Figure 2:
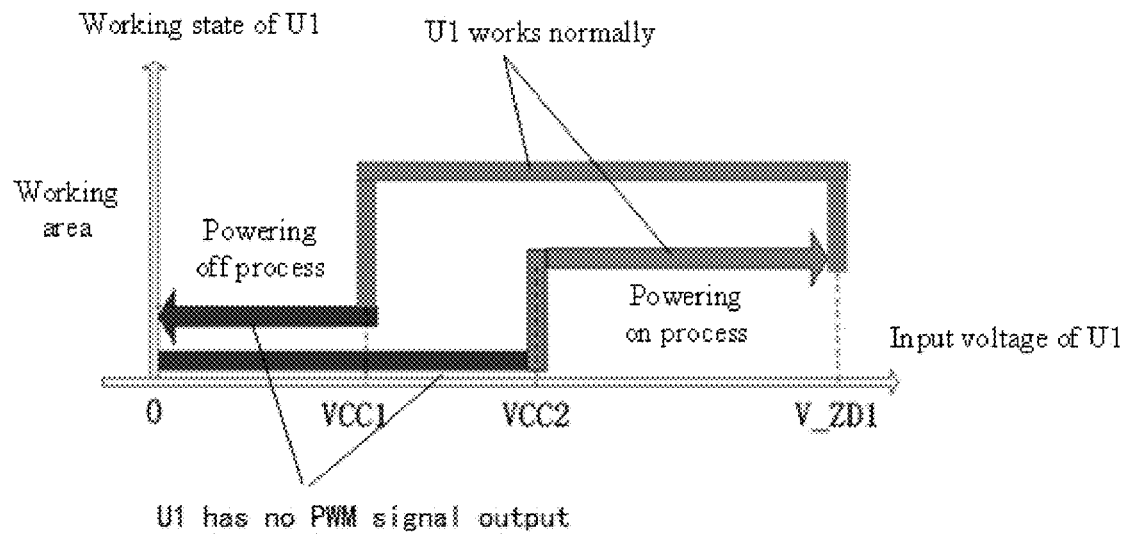

FIG. 2 is a working principal diagram of the auxiliary power source circuit shown in FIG. 1.

Figure 3:
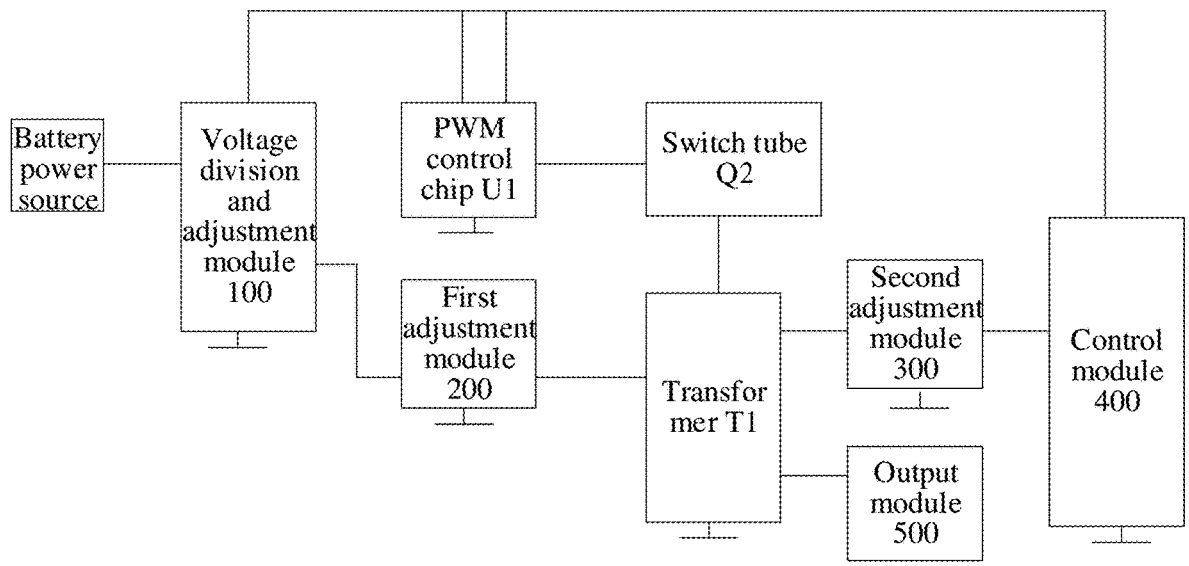

FIG. 3 is a schematic diagram of an auxiliary power source circuit having ultra-low standby power consumption in a preferred embodiment of this disclosure.

Figure 4:
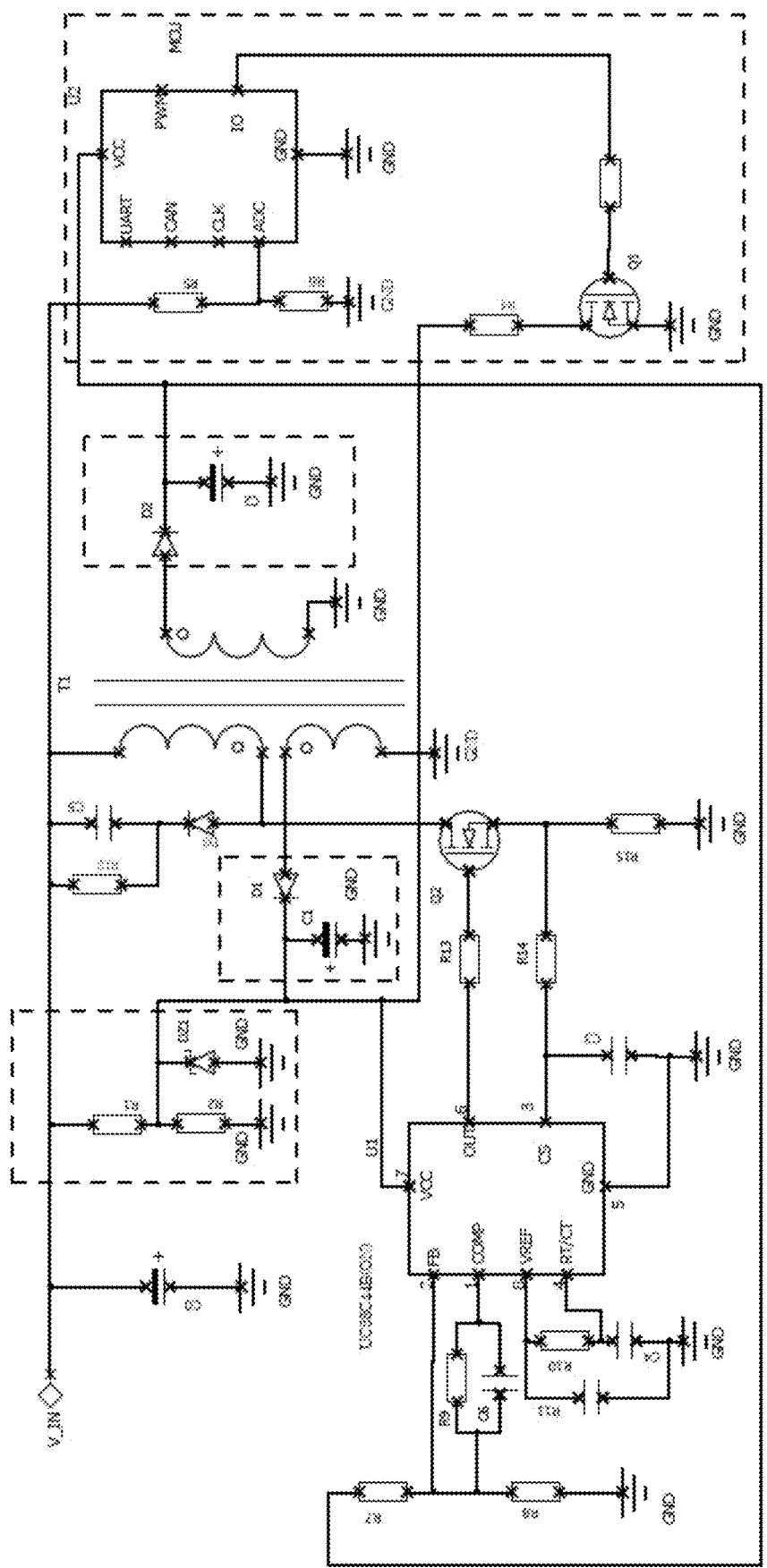

FIG. 4 is a circuit diagram of an auxiliary power source circuit having ultra-low standby power consumption in a preferred embodiment of this disclosure.

DESCRIPTION OF THE PREFERRED EMBODIMENTS

Best Embodiments of this Disclosure

In order to make the purpose, technical solution, and advantages of this disclosure clearer, the following provides further detailed explanations of this disclosure in conjunction with the accompanying drawings and embodiments. It should be understood that the specific embodiments described here are only intended to explain this disclosure and are not intended to limit this disclosure.

FIG. 3 is a schematic diagram of an auxiliary power source circuit having ultra-low standby power consumption in a preferred embodiment of this disclosure. As shown in FIG. 3, an auxiliary power source circuit having ultra-low standby power consumption of this disclosure includes a transformer T1, a PWM control chip U1, a battery power source and a switch tube Q2 which are arranged at a primary side of the transformer T1, as well as an output module 500, a voltage division and adjustment module 100, a first adjustment module 200, a second adjustment module 300, and a control module 400, which are arranged at a secondary side of the transformer T1.

In this disclosure, the transformer T1, the PWM control chip U1, the battery power source, the switch tube Q2, and the output module 500 can be constructed with reference to any suitable prior art configuration, such as the corresponding components in the auxiliary power source circuit shown in FIG. 1, and are not repeated here.

Furthermore, as shown in FIG. 3, a first terminal of the voltage division and adjustment module 100 is connected with the battery power source to receive an input voltage, a second terminal of the voltage division and adjustment module 100 is grounded, and a third terminal of the voltage division and adjustment module 100 is connected with a voltage terminal of the PWM control chip U1. A first terminal of the first adjustment module 200 is connected with the voltage terminal of the PWM control chip U1, a second terminal of the first adjustment module 200 is connected with a primary coil of the transformer T1, and a third terminal of the first adjustment module 200 is grounded. A first terminal of the second adjustment module 300 is connected with a secondary coil of the transformer T1, a second terminal of the second adjustment module 300 is connected with a first terminal of the control module 400 and a feedback control terminal of the PWM control chip U1, and a third terminal of the second adjustment module 300 is grounded. A second terminal of the control module 400 is connected with the battery power source, a third terminal of the control module 400 is grounded, and a fourth terminal of the control module 400 is connected with the voltage terminal of the PWM control chip U1.

In this preferred embodiment, the control module 400 is configured to calculate a minimum insufficient voltage of the battery power source according to a minimum startup voltage of the PWM control chip U1 and a shutdown voltage of the PWM control chip U1, as well as a module parameter of the voltage division and adjustment module 100. The control module 400 is further configured to select an insufficient voltage of the battery power source based on the minimum insufficient voltage of the battery power source and a battery power source voltage. That is, the control module 400 is capable of selecting any one voltage, which is in a range from the minimum insufficient voltage of the battery power source and the battery power source voltage, as the insufficient voltage of the battery power source, so as to flexibly adjust the insufficient voltage of the battery power source.

The control module 400 is further configured to adjust a module parameter of the first adjustment module 200 and a module parameter of the second adjustment module 300, so as maintain power supply time of the control module 400 until a power supply voltage of the PWM control chip U1 drops to power off the PWM control chip U1. When the auxiliary power source circuit is working, the control module 400 acquires the input voltage and controls a discharge speed of the power supply voltage when the input voltage is lower than the insufficient voltage of the battery power source. After the discharge is completed, the PWM control chip U1 and the control module 400 are powered off. After the input voltage drops to the insufficient voltage of the battery power source, the auxiliary power source circuit only re-starts working after the battery power source is re-charged to supply the power supply voltage which is greater than the minimum startup voltage of the PWM control chip U1.

Through this setting, the auxiliary power source circuit no longer frequently performs self-starting after shutdown, thereby truly reducing standby power consumption, and suppresses a circuit formation by a battery current passing through the transformer and MOS transistor, thereby greatly reducing current loss. In additional, the insufficient voltage of the battery power source in the auxiliary power source circuit is also flexibly adjustable.

In a preferred embodiment of this disclosure, the voltage division and adjustment module 100 may adopt any suitable voltage division circuit, such as including a first resistor, a second resistor, and a first diode, wherein the first resistor and the second resistor are connected in series between the input voltage and the ground, and a cathode of the first diode is connected with a voltage division point of the first resistor and the second resistor, and an anode of the first diode is grounded, wherein the voltage division point is configured to output the power supply voltage of the PWM control chip U1 to the voltage terminal of the PWM control chip U1. In other preferred embodiments of this disclosure, the first resistor may be divided into two or more resistors. By setting the resistance values of the first resistor and the second resistor, the minimum insufficient voltage of the battery power source can be calculated based on the resistance values, the minimum startup voltage of the PWM control chip U1, and the shutdown voltage of the PWM control chip U1.

In a preferred embodiment of this disclosure, the first adjustment module 200 includes a second diode and a first capacitor, wherein an anode of the second diode is connected with the primary coil of the transformer T1, a cathode of the second diode is connected with the voltage terminal of the PWM control chip U1 and a first terminal of the first capacitor, a second terminal of the first capacitor is grounded. The second adjustment module 300 includes a third diode and a second capacitor, wherein an anode of the third diode is connected with the secondary coil of the transformer T1, a cathode of the third diode is connected with the first terminal of the control module 400 and a first terminal of the second capacitor, and a second terminal of the second capacitor is grounded. Capacitance values of the first capacitor and the second capacitor can be adjusted to maintain the power supply time of the control module 400 until the power supply voltage of the PWM control chip U1 drops to power off the PWM control chip U1.

In a preferred embodiment of this disclosure, the control module 400 includes an MCU, a third resistor, a fourth resistor, and a second switch tube. A voltage terminal of the MCU is connected with the second terminal of the second adjustment module 300, an output terminal of the MCU is connected with a first terminal of the second switch tube through the third resistor, a second terminal of the second switch tube is connected with the voltage terminal of the PWM control chip U1 through the fourth resistor, and the third terminal of the second switch tube is grounded. A data acquisition terminal of the MCU is connected with the battery power source. The MCU is configured to acquire the input voltage through the data acquisition terminal, and send a shutdown instruction through the output terminal when the input voltage is lower than the insufficient voltage of the battery power source, and adjust the fourth resistor, so as to adjust a discharge speed of the power supply voltage.

In further preferred embodiments of this disclosure, in order to better acquire the input voltage, the control module further includes a sixth resistor and a fifth resistor, and the data acquisition terminal of the MCU is grounded through the sixth resistor and connected with the battery power source through the fifth resistor. The MCU is further configured to read the battery power source voltage of the battery power source through the data acquisition terminal and flexibly adjust the insufficient voltage of the battery power source.

FIG. 4 is a circuit diagram of an auxiliary power source circuit having ultra-low standby power consumption in a preferred embodiment of this disclosure. As shown in FIG. 4, an auxiliary power source circuit having ultra-low standby power consumption of this disclosure includes a transformer T1, a PWM control chip U1, a battery power source and a switch tube Q2 which are arranged at a primary side of the transformer, and a voltage division and adjustment module, an adjustment module and a control module. In other preferred embodiments of this disclosure, the adjustment module can also be divided into a first adjustment module and a second adjustment module.

Furthermore, as shown in FIG. 4, the voltage division and adjustment module includes a resistor R1, a resistor R2, and a diode DZ1. The resistor R1 and the resistor R2 are connected in series between a battery power source and ground GND to receive an input voltage V-IN. A cathode of the diode DZ1 is connected with a voltage division point of the resistor R1 and the resistor R2, and an anode of the diode DZ1 is grounded GND. In a preferred embodiment of this disclosure, the diode DZ1 is a Zener diode. The voltage division point outputs a power supply voltage of the PWM control chip U1 to a voltage terminal VCC of the PWM control chip U1. Due to that the input voltage V-IN of the battery power source, after being divided by the resistor R1 and resistor R2, outputs the power supply voltage of the PWM control chip U1 to the voltage terminal VCC of the PWM control chip U1, therefore, a minimum insufficient voltage of the battery power source can be calculated based on the resistance values of the resistor R1 and resistor R2, a minimum startup voltage of the PWM control chip U1, and a shutdown voltage of the PWM control chip U1. The diode DZ1 achieves a voltage clamping function.

Using chip UC3844B as the PWM control chip U1 and 100 pieces of lithium iron phosphate batteries as the battery power source, the specific instructions are as follows.

According to the instruction manual of chip UC3844B, the minimum startup voltage VCC2 is 16V, and the shutdown voltage VCC1 is 10V. According to the instruction manual of lithium iron phosphate batteries, the nominal voltage of each lithium iron phosphate battery is 3.2V, and the minimum discharge voltage is 2.2V~2.5V. Firstly, the resistance value of the resistor R2 is set as R2=10K Ω, such that, when the 100 lithium iron phosphate batteries work normally, the battery power source voltage is 320V. In order to ensure that the auxiliary power source circuit starts working normally, the PWM control chip U1 (UC3844B) should receive a power supply voltage from the voltage division point that is greater than or equal to the minimum startup voltage VCC2, that is, it is necessary to ensure that the power supply voltage is greater than or at least equal to 16V. According to the voltage division formula: 320V*R2/(R1+R2)=16V, R1<=190K Ω can be derived.

After obtaining the resistance values of resistors R1 and R2, it is known that R1=190K Ω, R2=10K Ω, and the shutdown voltage VCC1=10V, it can be deducted that the minimum insufficient voltage of the battery power source VINMin=200V, when the auxiliary power source circuit enters the insufficient voltage standby state, according to the formula VINMin*R2/(R1+R2)=10V. Therefore, the insufficient voltage of the battery power source, when the auxiliary power source circuit enters the insufficient voltage standby state, can be set within the range of 200V-320V. Therefore, by flexibly selecting the insufficient voltage of the battery power source within this range, the sleep state of insufficient voltage for the auxiliary power source circuit can be flexibly set.

Furthermore, as shown in FIG. 3, the adjustment module includes a diode D1, a capacitor C1, a diode D2, and a capacitor C2. An anode of the diode D1 is connected with the primary coil of the transformer, a cathode of the diode D1 is connected with the voltage terminal VCC of the PWM control chip U1 and a first terminal of the capacitor C1. A second terminal of the capacitor C1 is grounded GND. An anode of the diode D2 is connected with the secondary coil of the transformer, and a cathode of the diode D2 is connected with a first terminal of the capacitor C2, a second terminal of capacitor C2 is grounded GND.

The control module includes an MCU U2, a resistor R3, a resistor R4, a resistor R5, a resistor R6, a resistor R7, and a switch tube Q1. A voltage terminal of the MCU U2 is connected with the cathode of the diode D2 and a feedback control terminal FB of the PWM control chip U1 through the resistor R7. An output terminal IO of the MCU U2 is connected with a first terminal of the switch tube Q1 through the resistor R3, and a second terminal of the switch tube Q1 is connected with the voltage terminal of PWM control chip U1 through the resistor R4, a third terminal of the switch tube Q1 is grounded GND. A data acquisition terminal ADC of MCU U2 is grounded through the resistor R6 and connected with the battery power source through the resistor R5. In the preferred embodiment of this disclosure, the switch tube Q1 is preferably a MOS transistor, with its gate connected with the resistor R3, its source grounded, and its drain connected with the voltage terminal of the PWM control chip U1 through the resistor R4.

Capacitance values of the capacitor C1 and capacitor C2 can be adjusted to maintain the power supply time of the MCU U2 until the power supply voltage of the PWM control chip U1 drops to power off the PWM control chip U1.

Assuming that the normal output voltage of the diode D2 is 5V, the shutdown voltage of the MCU U2 is 2.7V, and the current flowing through the diode D2 is I2, the power supply time t2 of MCU U2 can be derived from the following formula:

$$W=PT$$

$$W=(½)*C*U*U$$

$$P=UI.$$

Among them, P represents power, T represents time, C represents capacitance value, U represents voltage, and I represents current value.

Therefore, the electrical power of the diode D2 is W=(½)*C2*5*5−(½)*C2*2.7*2.7=P2*t2.

By detecting the output voltage of the diode D2 and current I2 flowing through the diode D2, the power supply time t2 of MCU U2 can be adjusted by adjusting the capacitance value of the capacitor C2.

Due to the voltage terminal of the PWM control chip U1 being grounded through the capacitor C1 and being grounded through the resistor R4 and the switch tube Q1, respectively, power-off time t1 of the PWM control chip U1 is determined by discharge time parameters of the capacitor C1 and the resistor R4, approximately obtained by the following formula: t1≈C1*R4.

Therefore, the power-off time t1 of the PWM control chip U1 can be adjusted by adjusting the capacitance value of capacitor C1. Therefore, the capacitance values of the capacitors C1 and C2 can be adjusted to maintain t2>t1, such that the power supply time of the MCU U2 can be maintained until the power supply voltage of the PWM control chip U1 drops to power off the PWM control chip U1.

In another preferred embodiment of this disclosure, the power-off time t1 and the power supply time t2 can be directly detected through an oscilloscope. If it is found that they do not satisfy the requirement of t2>t1, the capacitance values of capacitors C1 and C2 can be adjusted until they satisfy the requirement of t2>t1.

When the auxiliary power source circuit is working, the MCU U2 acquires the input voltage through the data acquisition terminal ADC, and sends a shutdown instruction through the output terminal IO when the input voltage is lower than the insufficient voltage of the battery power source, and adjusts the resistor R4 to adjust the discharge speed of the power supply voltage.

During the operation of the auxiliary power source circuit, the MCU U2 can sample the input voltage through the data acquisition terminal ADC. When the input voltage is lower than the insufficient voltage of the battery power source, the MCU U2 sends a shutdown instruction through its output terminal IO. As mentioned earlier, the insufficient voltage of the battery power source can be selected and set between a range from the minimum insufficient voltage of the battery power source of 200V and the battery power source voltage of 320V in the aforementioned examples. At this time, when the input voltage is below 200V, the auxiliary power source circuit shuts down on its own. When the input voltage is above 320V, even if the MCU gives a shutdown instruction, the auxiliary power source circuit starts again on its own after shutting down.

As mentioned earlier, as the voltage terminal of the PWM control chip U1 being grounded through capacitor C1 and being grounded through resistor R4 and the switch tube Q1, respectively, the power-off time t1 of the PWM control chip U1 is determined by the discharge time parameters of the capacitor C1 and the resistor R4, approximately obtained by the following formula: t1≈C1*R4. Therefore, by adjusting the resistance value of the resistor R4, the power-off time t1 of the PWM control chip U1 can be adjusted, that is, the discharge speed of the power supply voltage of the PWM control chip U1 can be adjusted. At this point, the resistor R4 can also be adjusted to prevent excessive discharge current and protect the switch tube Q1.

After the discharge of the switch tube Q1 is completed, the PWM control chip U1 and the MCU U2 are powered down. Due to the fact that after the discharge of the switch tube Q1 is completed, the PWM control chip U1 enters the power-off sleep stage, and when the power on capacitor C2 is consumed, the MCU U2 is also powered off and stops working. The entire system no longer consumes energy. At this point, the power consumption of the PWM control chip U1 is also reduced from 12 mA to 2 uA, and the entire auxiliary power source circuit never frequently starts, avoiding the energy consumption of several ampere by the circuit caused by the battery current passing through the transformer and the switch tube Q2.

After the input voltage drops to the insufficient voltage of the battery power source, the auxiliary power source circuit only starts working after the battery power source is re-charged to satisfy the requirement that the power supply voltage is greater than the minimum startup voltage of the PWM control chip U1. Due to that when the auxiliary power source circuit is powered off, that is the battery power source is powered off, the battery power source actually still has electrical power, but the auxiliary power source circuit cannot start. Therefore, when the output voltage of the battery power source (i.e. the input voltage as shown in the figure) drops to the previously set insufficient voltage of the battery power source, the power supply voltage of the PWM control chip U1 will be lower than its minimum startup voltage VCC2, such as 16V, and the PWM control chip U1 will not make frequent attempts to start. Until the battery power source is re-charged such that the input voltage is higher than the previously set insufficient voltage of the battery power source, and the power supply voltage of the PWM control chip U1 is higher than the minimum startup voltage VCC2 (the situation shown in FIG. 2 that during the power on process, when the voltage curve is greater than VCC2), the auxiliary power source circuit re-starts working.

This disclosure enables the inputted power supply voltage of the PWM control chip U1 to be adjustable by setting a voltage division and adjustment module, and enables the MCU to conveniently shut down the PWM control chip by sending a shutdown instruction, thereby completely shutting down the auxiliary power source circuit, through the combination control of the MCU and the PWM control chip U1. As long as the input voltage is not higher than the aforementioned insufficient voltage of the battery power source, the PWM control chip U1 cannot self-start frequently. Furthermore, by adjusting the capacitance values of capacitors C1 and C2 in a reasonable ratio, the power off time of the MCU can be after the power off time of the PWM control chip U1, ensuring the control of the MCU over the PWM control chip. And due to the presence of the MCU, it can read the battery power source voltage from its own terminal, and the MCU can also flexibly select the insufficient voltage of the battery power source. Therefore, when implementing the auxiliary power source circuit having ultra-low standby power consumption, the auxiliary power source circuit no longer frequently performs self-starting after shutdown, thereby truly reducing standby power consumption, and suppresses a circuit formation by a battery current passing through the transformer and the MOS transistor, thereby greatly reducing current loss. In additional, the insufficient voltage of the battery power source in the auxiliary power source circuit is also flexibly adjustable.

For example, for ATMs in universities, there are backup battery power sources. During winter and summer vacations in universities, in order to ensure safety, universities usually conduct a power outage on the ATMs. In the early stage of power outage, the ATMs use battery energy to work normally for a period of time. When the battery energy is low, the ATMs enter a standby mode and stop working. If the traditional auxiliary power source circuit is used in the ATMs, even if the system has been shut down, the auxiliary power source still works as usual. Even if the battery power source voltage is lower than the normal working voltage of the auxiliary power source, the auxiliary power source still starts up frequently, which continues to cause power loss and may greatly reduce the life of the battery power source. After adopting the auxiliary power source circuit having ultra-low standby power consumption of this disclosure, compared to the traditional auxiliary power startup method, the battery can consume much less energy during a waiting time of 1-2 months after the auxiliary power source is turned off, greatly extending the life of the battery power source and improving the system reliability.

Although this disclosure is described through specific embodiments, those skilled in the art should understand that various transformations and equivalent substitutions can be made to this disclosure without departing from the scope of this disclosure. In addition, various modifications can be made to this disclosure for specific situations or materials without departing from the scope of this disclosure. Therefore, this disclosure is not limited to the disclosed specific embodiments but should include all embodiments falling within the scope of the claims of this disclosure.

The above is only preferred embodiments of this disclosure and is not intended to limit this disclosure. Any modification, equivalent replacement and improvement made within the spirit and principles of this disclosure shall be included in the protection scope of this disclosure.

What is claimed is:

1. An auxiliary power source circuit having ultra-low standby power consumption, comprising a transformer, a PWM control chip, a battery power source and a first switch tube which are arranged at a primary side of the transformer, and an output module which is arranged at a secondary side of the transformer;
   wherein the auxiliary power source circuit having ultra-low standby power consumption further comprises a voltage division and adjustment module, a first adjustment module, a second adjustment module, and a control module;
   a first terminal of the voltage division and adjustment module is connected with the battery power source to receive an input voltage, a second terminal of the voltage division and adjustment module is grounded, and a third terminal of the voltage division and adjustment module is connected with a voltage terminal of the PWM control chip;
   a first terminal of the first adjustment module is connected with the voltage terminal of the PWM control chip, a second terminal of the first adjustment module is connected with a primary coil of the transformer, and a third terminal of the first adjustment module is grounded;
   a first terminal of the second adjustment module is connected with a secondary coil of the transformer, a second terminal of the second adjustment module is connected with a first terminal of the control module and a feedback control terminal of the PWM control chip, and a third terminal of the second adjustment module is grounded;
   a second terminal of the control module is connected with the battery power source, a third terminal of the control module is grounded, and a fourth terminal of the control module is connected with the voltage terminal of the PWM control chip;
   the control module is configured to calculate a minimum insufficient voltage of the battery power source according to a minimum startup voltage of the PWM control chip and a shutdown voltage of the PWM control chip, as well as a module parameter of the voltage division and adjustment module, and configured to select an insufficient voltage of the battery power source based on the minimum insufficient voltage of the battery power source and a battery power source voltage;
   the control module is further configured to adjust a module parameter of the first adjustment module and a module parameter of the second adjustment module, so as maintain power supply time of the control module until a power supply voltage of the PWM control chip drops to power off the PWM control chip;
   during an operation of the auxiliary power source circuit, the control module is further configured to acquire the input voltage and control a discharge speed of the power supply voltage when the input voltage is lower than the insufficient voltage of the battery power source; wherein the control module and the PWM control chip are powered off, after a discharge of the power supply voltage is completed;

the auxiliary power source circuit is configured to re-start working only when the battery power source is re-charged to supply the power supply voltage which is greater than the minimum startup voltage of the PWM control chip, after the input voltage drops to the insufficient voltage of the battery power source.

2. The auxiliary power source circuit having ultra-low standby power consumption according to claim 1, wherein the voltage division and adjustment module comprises a first resistor, a second resistor, and a first diode, wherein the first resistor and the second resistor are connected in series between the input voltage and the ground, a cathode of the first diode is connected with a voltage division point of the first resistor and the second resistor, and an anode of the first diode is grounded, wherein the voltage division point is configured to output the power supply voltage of the PWM control chip to the voltage terminal of the PWM control chip;

the control module is further configured to set resistance values of the first resistor and the second resistor, and calculate the minimum insufficient voltage of the battery power source based on the resistance values, the minimum startup voltage of the PWM control chip, and the shutdown voltage of the PWM control chip.

3. The auxiliary power source circuit having ultra-low standby power consumption according to claim 1, wherein the first adjustment module comprises a second diode and a first capacitor, wherein an anode of the second diode is connected with the primary coil of the transformer, a cathode of the second diode is connected with the voltage terminal of the PWM control chip and a first terminal of the first capacitor, a second terminal of the first capacitor is grounded.

4. The auxiliary power source circuit having ultra-low standby power consumption according to claim 3, wherein the second adjustment module comprises a third diode and a second capacitor, wherein an anode of the third diode is connected with the secondary coil of the transformer, a cathode of the third diode is connected with the first terminal of the control module and a first terminal of the second capacitor, and the second terminal of the second capacitor is grounded;

the control module is further configured to adjust capacitance values of the first capacitor and the second capacitor, so as to maintain the power supply time of the control module until the power supply voltage of the PWM control chip drops to power off the PWM control chip.

5. The auxiliary power source circuit having ultra-low standby power consumption according to claim 1, wherein the control module comprises an MCU, a third resistor, a fourth resistor, and a second switch tube; wherein a voltage terminal of the MCU is connected with the second terminal of the second adjustment module, an output terminal of the MCU is connected with a first terminal of the second switch tube through the third resistor, a second terminal of the second switch tube is connected with the voltage terminal of the PWM control chip through the fourth resistor, and a third terminal of the second switch tube is grounded; wherein a data acquisition terminal of the MCU is connected with the battery power source;

the MCU is configured to acquire the input voltage through the data acquisition terminal, send a shutdown instruction through the output terminal when the input voltage is lower than the insufficient voltage of the battery power source, and adjust the fourth resistor, so as to adjust the discharge speed of the power supply voltage.

6. The auxiliary power source circuit having ultra-low standby power consumption according to claim 5, wherein the control module further comprises a fifth resistor and a sixth resistor, wherein the data acquisition terminal of the MCU is grounded through the sixth resistor and connected with the battery power source through the fifth resistor.

7. The auxiliary power source circuit having ultra-low standby power consumption according to claim 5, wherein the MCU is further configured to adjust the insufficient voltage of the battery power source.

8. An auxiliary power source circuit having ultra-low standby power consumption is provided, comprising a transformer, and a PWM control chip, a battery power source, and a first switch tube which are arranged at a primary side of the transformer;

wherein the auxiliary power source circuit having ultra-low standby power consumption further comprises a voltage division and adjustment module, an adjustment module, and a control module;

the voltage division and adjustment module comprises a first resistor, a second resistor, and a first diode, wherein the first resistor and the second resistor are connected in series between an input voltage and ground, a cathode of the first diode is connected with a voltage division point of the first resistor and the second resistor, and an anode of the first diode is grounded, wherein the voltage division point is configured to output a power supply voltage of the PWM control chip to a voltage terminal of the PWM control chip;

the adjustment module comprises a second diode, a first capacitor, a third diode and a second capacitor, an anode of the second diode is connected with a primary coil of the transformer, a cathode of the second diode is connected with the voltage terminal of the PWM control chip and a first terminal of the first capacitor, a second terminal of the first capacitor is grounded, an anode of the third diode is connected with a secondary coil of the transformer, a cathode of the third diode is connected with a first terminal of the second capacitor, and the second terminal of the second capacitor is grounded;

the control module comprises an MCU, a third resistor, a fourth resistor, and a second switch tube; wherein a voltage terminal of the MCU is connected with the cathode of the third diode and a feedback control terminal of the PWM control chip, an output terminal of the MCU is connected with a first terminal of the second switch tube through the third resistor, a second terminal of the second switch tube is connected with the voltage terminal of the PWM control chip through the fourth resistor, and a third terminal of the second switch tube is grounded; wherein a data acquisition terminal of the MCU is connected with the battery power source;

the MCU is configured to set resistance values of the first resistor and the second resistor, and configured to calculate a minimum insufficient voltage of the battery power source based on the resistance values, a minimum startup voltage of the PWM control chip, and a shutdown voltage of the PWM control chip;

the MCU is further configured to select an insufficient voltage of the battery power source based on the minimum insufficient voltage of the battery power source and a battery power source voltage;

the MCU is further configured to adjust capacitance values of the first capacitor and the second capacitor, so as to maintain power supply time of the MCU until the power supply voltage of the PWM control chip drops to power off the PWM control chip;

the MCU is further configured to acquire the input voltage through the data acquisition terminal, send a shutdown instruction through the output terminal when the input voltage is lower than the insufficient voltage of the battery power source, and adjust the fourth resistor to adjust a discharge speed of the power supply voltage;

wherein the MCU and the PWM control chip are powered off, after a discharge of the power supply voltage is completed;

the auxiliary power source circuit is configured to re-start working only when the battery power source is re-charged to supply the power supply voltage which is greater than the minimum startup voltage of the PWM control chip, after the input voltage drops to the insufficient voltage of the battery power source.

9. The auxiliary power source circuit having ultra-low standby power consumption according to claim 8, further comprising a fifth resistor and a sixth resistor, wherein the data acquisition terminal of the MCU is grounded through the sixth resistor and connected with the battery power source through the fifth resistor.

10. The auxiliary power source circuit having ultra-low standby power consumption according to claim 8, wherein the MCU is further configured to adjust the insufficient voltage of the battery power source.

* * * * *